United States Patent [19]
Harasaki

[11] Patent Number: 4,799,730
[45] Date of Patent: Jan. 24, 1989

[54] ARRANGEMENTS FOR FORMING REAR PARTIAL STRUCTURES OF VEHICLE BODY CONSTRUCTIONS

[75] Inventor: Hayatsugu Harasaki, Tsukimi, Japan

[73] Assignee: Mazda Motor Corporation, Japan

[21] Appl. No.: 76,400

[22] Filed: Jul. 22, 1987

[30] Foreign Application Priority Data

Jul. 31, 1986 [JP] Japan .................................. 61-181009
Jul. 31, 1986 [JP] Japan .................................. 61-181010

[51] Int. Cl.$^4$ ............................................. B62D 25/00
[52] U.S. Cl. ...................................... 296/195; 296/56; 296/146; 296/76
[58] Field of Search .................. 296/146, 76, 195, 1 S, 296/56

[56] References Cited

U.S. PATENT DOCUMENTS

| | | | |
|---|---|---|---|
| 4,350,384 | 9/1982 | Yasuda | 296/146 |
| 4,353,111 | 10/1980 | Gallitzendorfer | 296/146 |
| 4,413,854 | 11/1983 | Hirshberg | 296/146 |
| 4,436,336 | 3/1984 | Shimizu | 296/146 |

FOREIGN PATENT DOCUMENTS

| | | | |
|---|---|---|---|
| 84219 | 5/1982 | Japan | 296/146 |
| 59-2643 | 1/1984 | Japan . | |

*Primary Examiner*—Robert R. Song
*Attorney, Agent, or Firm*—Gerald J. Ferguson, Jr.

[57] ABSTRACT

An arrangement for forming a rear partial structure of a vehicle body construction comprises, a rear end portion of a vehicle body forming an opening therein, a rear lamp assembly mounted on the rear end portion of the vehicle body so as to be disposed at a lower margin of the opening, and a tailgate mounted on the rear end portion of the vehicle body to be operative to open and close the opening. The tailgate includes a gate frame member which is attached through a hinge to the rear end portion of the vehicle body and a tailgate glass which is attached to the gate frame member and provided with an extended portion incorporated therewith to extend outward beyond at least a portion of one side of the gate frame member so as to cover therewith an outer surface of the rear lamp assembly when the tailgate is in a position for closing the opening.

12 Claims, 4 Drawing Sheets

FIG. 4
FIG. 5
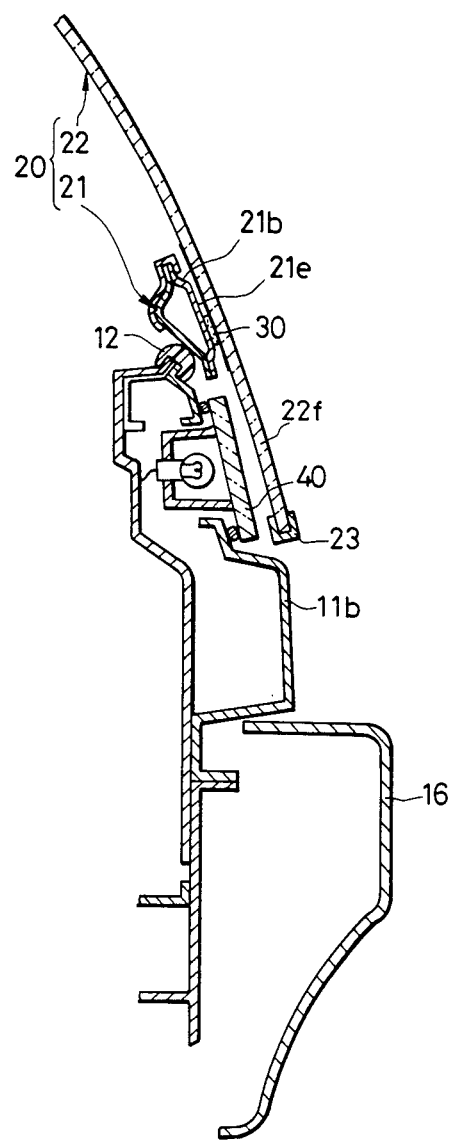
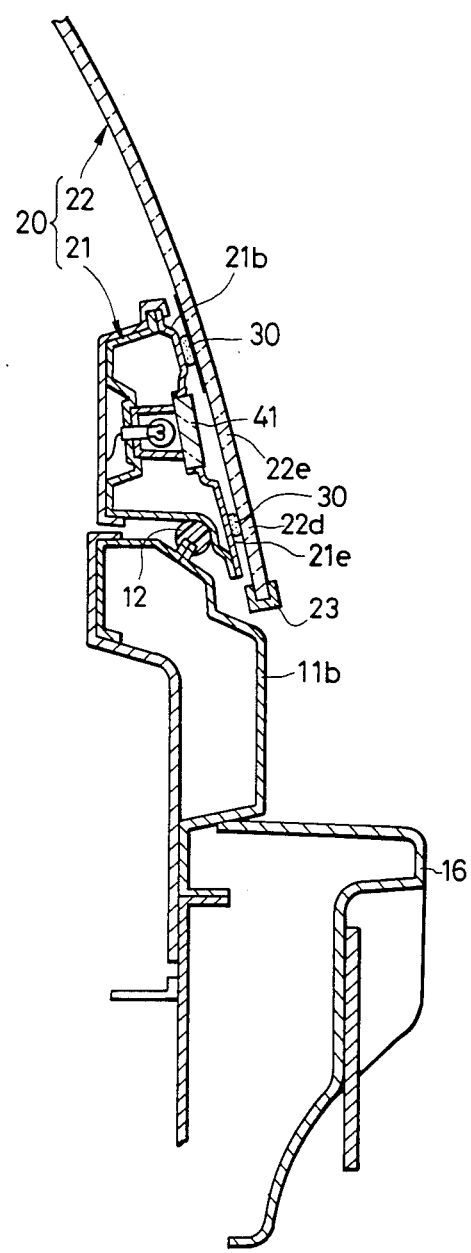

ARRANGEMENTS FOR FORMING REAR PARTIAL STRUCTURES OF VEHICLE BODY CONSTRUCTIONS

BACKGROUND OF THE INVENTION

1. Field of the Invention

The present invention relates generally to arrangements for forming rear partial structures of vehicle body constructions, and more particularly, is directed to an improvement in a rear partial structure of a vehicle body construction in which left and right rear pillars, a tailgate and various members and portions disposed in and around the rear pillars and tailgate are included.

2. Description of the Prior Art

On a rear portion of a vehicle body, at least one tail lamp assembly is usually mounted. In the event of a sedan or coupe type automobile having a trunk room at its rear portion, for example, left and right tail lamp assemblies are provided respectively on the left and right sides of a rear outer panel positioned behind the trunk room, as shown in the Japanese utility model application published before examination under publication No. 59-2643.

In such a rear portion of the vehicle body as proposed previously, the outer surface of each tail lamp assembly may usually be set to have a difference in level compared with the outer surface of the rear outer panel, for example, so as to protrude outward beyond the outer surface of the rear outer panel. This results in that the vehicle body has an uneven outer surface around the left and right tail lamp assemblies mounted thereon, and such unevenness on the outer surface of the vehicle body spoils the appearance of the vehicle body and becomes an obstacle to reduction of air resistance on the outer surface of the vehicle body.

In the meantime, although it is customary that air vents are provided on left and right rear side panels of a vehicle body, respectively, as shown in the Japanese utility model application published before examination under publication No. 60-180215, it has also been proposed to provide the air vents respectively on left and right rear pillars of a vehicle body in which each of left and right rear quarter window glasses extends backward to have an extension incorporated therewith and fixed with adhesive agent on the left or right rear pillar, so that a flush outer surface is obtained on each of the left and right sides of the vehicle body. In the case of the vehicle body having the rear pillars each provided with the air vent as described above, however, each air vent is formed with openings provided on both the rear pillar and the extension of the window glass fixed to the rear pillar and therefore it is not easy to position the extension of the window glass properly on the rear pillar and further it is required to keep the extension of the window glass, which is properly positioned on the rear pillar, remaining correctly on the rear pillar in order to adheve the extension to the rear side pillar. Consequently, complicated work conducted for a relatively long time is required for assembling the rear portion of the vehicle body.

OBJECTS AND SUMMARY OF THE INVENTION

Accordingly, it is an object of the present invention to provide an arrangement for forming a rear partial structure of a vehicle body construction, which avoids the aforementioned problems encountered with the prior art.

Another object of the present invention is to provide an arrangement for forming a rear partial structure of a vehicle body construction, by which a flush outer surface of the vehicle body construction is obtained around a rear lamp assembly mounted on a rear portion of the vehicle body construction.

A further object of the present invention is to provide an arrangement for forming a rear partial structure of a vehicle body construction, by which a flush outer surface is obtained on a rear portion of the vehicle body construction in which each rear lamp assembly and each rear pillar are included.

A still further object of the present invention is to provide an arrangement for forming a rear partial structure of a vehicle body construction, by which a flush outer surface of the vehicle body construction is obtained on and around each rear pillar on which a rear portion of a rear quarter window glass is fixed and an air vent is provided on the rear pillar with an opening formed through the rear portion of the rear quarter window glass which is easily attached to the rear pillar correctly.

According to the present invention, there is provided an arrangement for forming a rear partial structure of a vehicle body construction, which comprises a rear end portion of a vehicle body forming an opening therein, a rear lamp assembly mounted on the rear end portion of the vehicle body so as to be disposed at a lower margin of the opening formed in the rear end portion of the vehicle body, and a tailgate mounted on the rear end portion of the vehicle body to be operative to open and close the opening formed in the rear end portion of the vehicle body, said tailgate being composed of a gate frame member which is attached through a hinge to the rear end portion of the vehicle body and a tailgate glass which is attached to the gate frame member and provided with an extension incorporated therewith to extend outward beyond at least a portion of one side of the gate frame member so as to cover therewith an outer surface of the rear lamp assembly when the tailgate is in a position for closing the opening formed in the rear end portion of the vehicle body.

In the embodiment of arrangement for forming a rear partial structure of a vehicle body construction taken by way of example, the rear end portion of the vehicle body includes a pair of rear pillars disposed at left and right sides respectively to face each other with an opening therebetween and a rear portion of each of left and right rear quarter window glasses is attached to each rear pillar for covering an outer surface of the same. Further, an air vent is formed with openings provided on each rear pillar and the rear portion of the rear quarter window glass fixed thereon respectively and an air outlet trim which has a base portion fixed on the rear pillar, a side wall portion standing up from the base portion to surround a space on the base portion and provided with at least one opening thereon, and a fringe portion disposed at the end of the side wall portion and engaged with the opening provided on the rear portion of the rear quarter window glass on the rear pillar.

In the arrangement thus constituted in accordance with the present invention, since the rear lamp assembly mounted on the rear end portion of the vehicle body is covered by the extension of the tailgate glass attached to the gate frame member of the tailgate when the tail gate is in the position for closing the opening formed in the rear end portion of the vehicle body, a flush rear outer surface is obtained on the vehicle body and therefore the vehicle body is improved in its appearance and has reduced air resistance on the outer surface thereof.

In the embodiment mentioned above, since the air outlet trim which constitutes the air vent on each rear pillar is provided to be fixed to the rear pillar and engaged with the opening formed on the rear portion of the rear quarter window glass attached to the rear pillar for covering the same, the rear portion of each rear quarter window glass can easily be correctly positioned on the corresponding rear pillar to be fixed to cover the same, and complicated work conducted for a relatively long time is not required for assembling the rear end portion of the vehicle body.

The above, and other objects, features and advantages of the present invention will become apparent from the following detailed description which is to be read in conjunction with the accompanying drawings.

BRIEF DESCRIPTION OF THE DRAWINGS

FIG. 4 is a schematic cross-sectional view taken on line IV—IV in FIG. 1;

FIG. 5 is a schematic cross-sectional view taken on line V—V in FIG. 1;

DESCRIPTION OF THE PREFERRED EMBODIMENT

Now, an embodiment of arrangement for forming a rear partial structure of a vehicle body construction according to the present invention will be described with reference to the accompanying drawings.

Figure 1:
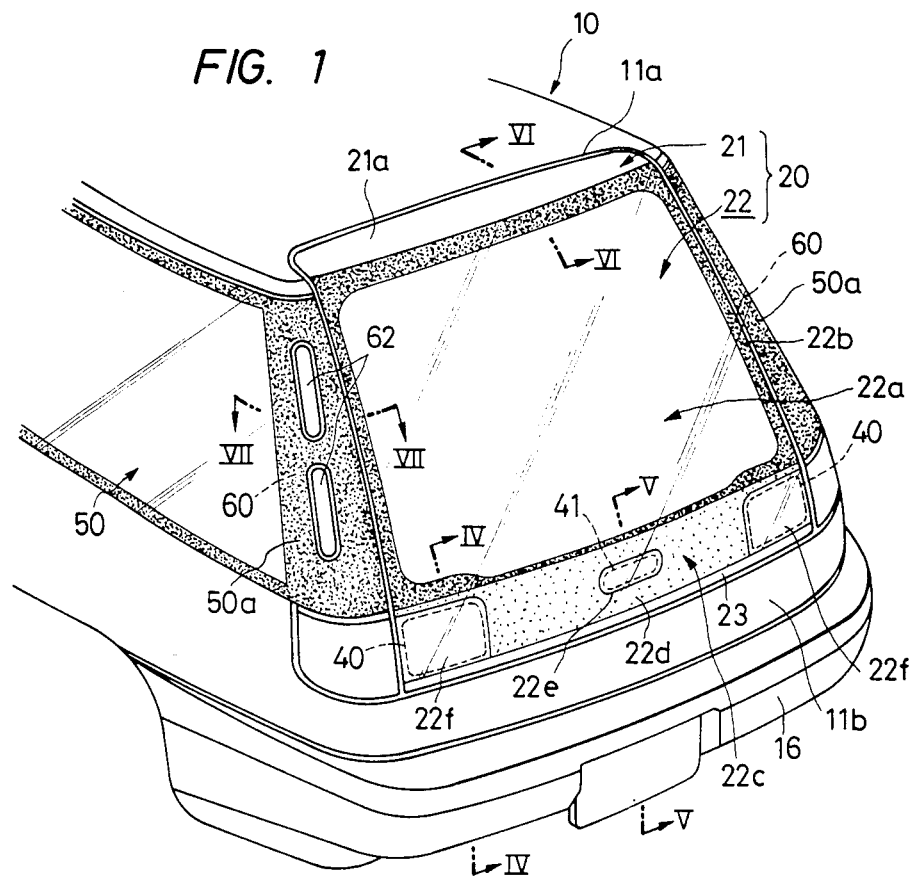
FIG. 1 is a schematic perspective view showing an embodiment of arrangement for forming a rear partial structure of a vehicle body construction according to the present invention.
Figure 6:
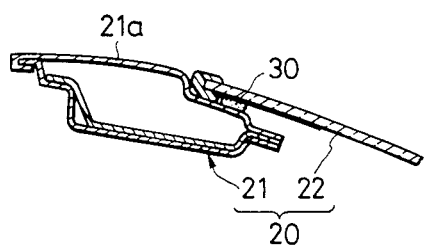
FIG. 6 is a schematic cross-sectional view taken on line VI—VI in FIG. 1.

FIG. 1 shows one example of arrangement for forming a rear partial structure of a vehicle body construction according to the present invention, which is applied to a station wagon type automobile. This station wagon type automobile has a vehicle body 10 which includes a rear end portion thereof in which a rear opening is provided. The rear end portion of the vehicle body 10 comprises a rear roof end 11a, left and right rear pillars 60 each covered by a rear portion 50a of a left or right rear quarter window glass 50, and a rear panel 11b having a lower portion thereof covered by a rear bumper 16, which are disposed to surround the rear opening. Further, the rear end portion of the vehicle body 10 is provided with a tailgate 20 which is mounted on the rear roof end 11a to be operative to open and close the rear opening.

Figure 2:
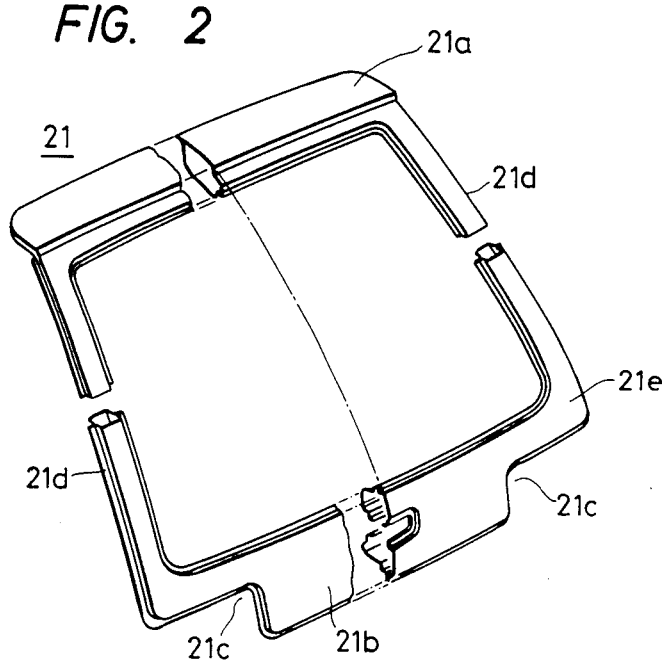
FIG. 2 is a schematic perspective view, partly in cutout, of an example of a gate frame member of a tailgate employed in the embodiment shown in FIG. 1.
Figure 3:
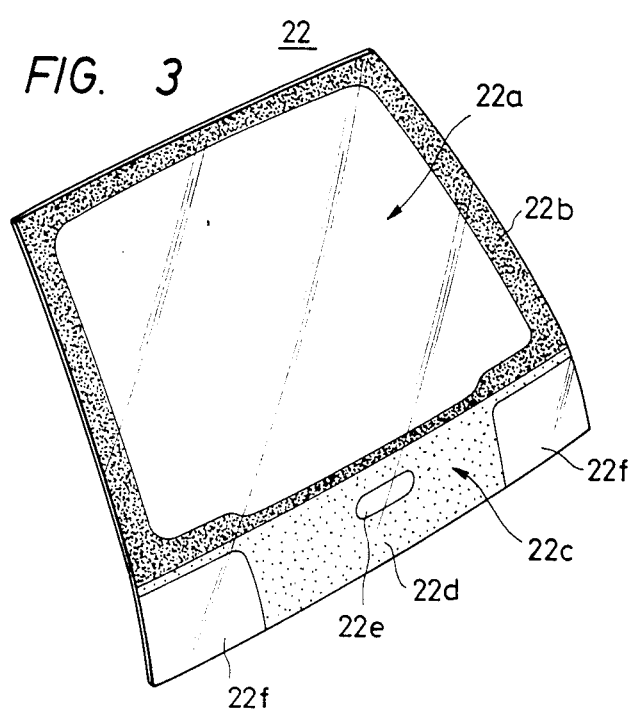
FIG. 3 is a schematic perspective view of a tailgate glass attached to the gate frame member shown in FIG. 2.

As shown in FIGS. 1 to 6, the tailgate 20 comprises a gate frame member 21, which is independently shown in FIG. 2 and attached through a hinge (not shown in the drawings) to the rear roof end 11a at an upper side 21a thereof so that a lower side 21b of the gate frame member 21 which is coupled through a pair of left and right sides 21d of the gate frame member 21 with the upper side 21a is able to be lifted, and a tailgate glass 22 which is independently shown in FIG. 3 and attached with adhesive agent 30 (FIGS. 4, 5 and 6) to a bonding surface portion 21e. The lower side 21b of the gate frame member 21 is provided with cutouts 21c at its left and right lower corner portions, respectively, and each of the upper side 21a, the lower side 21b and the left and right sides 21d is formed to have a closed cross section and provided thereon the bonding surface portion 21e.

The tailgate glass 22 includes a window portion 22a which is provided at its outer fringe with a bonding area 22b formed to correspond to the bonding surface portion 21e of the gate frame member 21 so as to be actually bonded to the same with the adhesive agent 30 and an extended portion 22c which is incorporated with the window portion 22a to extend from one side of the window portion 22a. An inner surface of the bonding area 22b provided in the window portion 22a is covered by, for example, a ceramic coating for opaquely blocking the inside of the tailgate glass 22. The extended portion 22c is provided at the generally central part thereof with a frosted area 22d, a first clear area 22e positioned to be surrounded by the frosted area 22d, and a pair of second clear areas 22f at left and right side parts thereof, respectively. Further, a lower end of the extended portion 22c is provided with an end protector 23.

In the situation wherein the tailgate glass 22 is fixed to the gate frame member 21 which is mounted through the hinge on the rear roof end 11a of the vehicle body 10, the extended portion 22c extends downward from the window portion 22a for covering the lower side 21b of the gate frame member 21 by the frosted area 22d and for covering also the cutouts 21c provided at the lower side 21b of the gate frame member 21 by the second clear areas 22f, respectively.

On the rear panel 11b which is disposed under the rear opening formed in the rear end portion of the vehicle body 10, left and right rear lamp assemblies 40 are mounted, as shown in FIGS. 1 and 4. The left and right rear lamp assemblies 40 are disposed at a lower margin of the rear opening provided in the rear end portion of the vehicle body 10 so as to enter in the cutouts 21c provided at the lower side 21b of the gate frame member 21, respectively, and therefore outer surfaces of the left and right rear lamp assemblies 40 are covered with the second clear areas 22f provided at the left and right side parts of the extended portion 22c of the tailgate glass 22 when the tailgate 20 is in a position to close the rear opening provided in the rear end portion of the vehicle body 10, as shown in FIGS. 1 and 4. Accordingly, a flush outer surface of the vehicle body 10 is obtained on and around the left and right rear lamp assemblies 40 mounted on the rear panel 11b. Incidentally, when the tailgate 20 is in the position to close the rear opening in the rear end portion of the vehicle body 10, the lower side 21b of the gate frame member 21 is received by a cushion member 12 mounted on the rear panel 11b.

In this embodiment, a high mount rear lamp assembly 41 is mounted on the lower side 21b of the gate frame member 21 so as to face the inner surface of the first clear area 22e provided in the extended portion 22c of the tailgate glass 22 which is attached to the gate frame member 21, as shown in FIGS. 1 and 5. This means that the outer surface of the high mount rear lamp assembly 41 is covered by the extended portion 22c of the tailgate glass 22 so that a flush outer surface of the vehicle body 10 is also obtained on and around the high mount rear lamp assembly 41.

Further, a pair of air 62 are provided for ventilating the inside of the vehicle body 10 on the left rear pillar 60 which is covered by the rear portion 50a of the left rear quarter window glass 50, as shown in FIG. 1, and similarly another pair of air extractors 62 are also provided for ventilating the inside of the vehicle body 10 on the right rear pillar 60 which is covered by the rear portion 50a of the right rear quarter window glass 50 though they are not shown in FIG. 1. Each of the rear portions 50a of the left and right rear quarter window glasses 50 has a rear end thereof which faces one of left and right ends of the tailgate glass 22 with a predetermined space therebetween.

Figure 7:
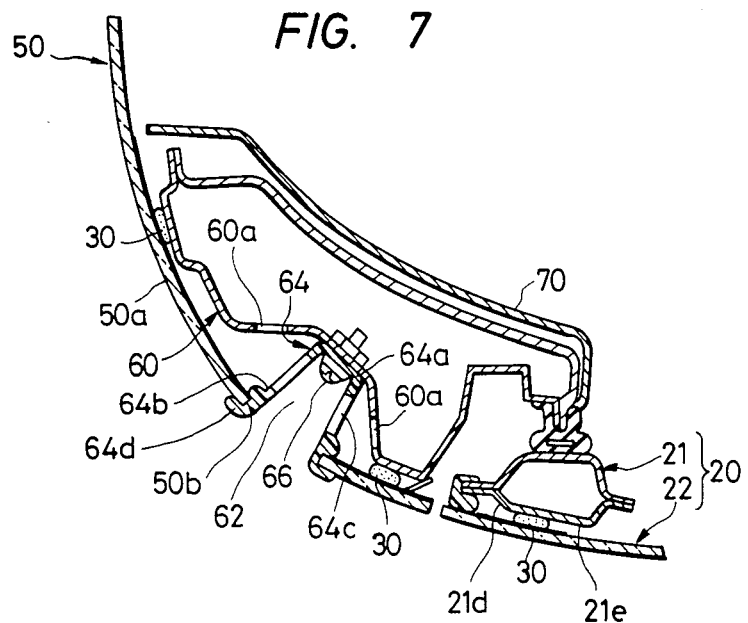
FIG. 7 is a schematic cross-sectional view taken on line VII—VII in FIG. 1.
Figure 8:
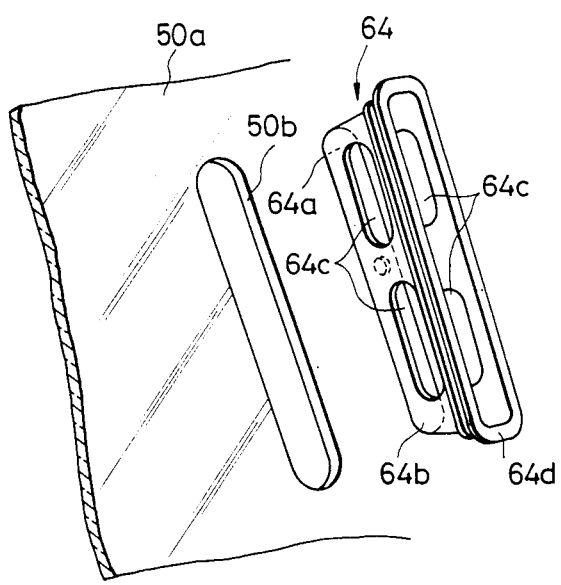
FIG. 8 is an exploded perspective view of a part of an example of an air vent employed in the embodiment shown in FIG. 1.

As shown in FIGS. 7 and 8, one of the air vents 62 provided on the left rear pillar 60 to which the rear portion 50a of the left rear quarter window glass 50 is fixed with the adhesive agent 30 at the outside and a lining member 70 is also attached at the inside, is formed with openings 60a formed on the left rear pillar 60, an opening 50b formed on the rear portion of the left rear quarter window glass 50, and an air outlet trim 64 interconnecting therethrough the left rear pillar 60 and the rear portion 50a of the left rear quarter window glass 50. The air outlet trim 64 has a base portion 64a fixed on the left rear pillar 60 by a screw 66, a side wall portion 64b standing up from the base portion 64a to surround a space on the base portion 64a and provided thereon with openings 64c and a fringe portion 64d disposed at the end of the side wall portion 64b and engaged with the opening 50b provided on the rear portion 50a of the left rear quarter window glass 50.

Further, the other of the air vents 62 provided on the left rear pillar 60 and each of the air vents 62 provided on the right rear pillar 60 are also constituted respectively in the same manner as the air vent 62 shown in FIG. 7.

In the air vents 62 thus constituted, air is derived from the inside to the outside of the vehicle body 10 through the openings 60a formed on the left or right rear pillar 60, the openings 64c formed on the side wall portion 64b of the air outlet trim 64 and the space surrounded by the fringe portion 64d of the air outlet trim 64.

In the aforementioned embodiment since the air outlet trim 64 which is provided for interconnecting therethrough each of the left and right rear pillars 60 and the rear portion 50a of each of the left and right rear quarter window glasses 50 is used, the rear portion 50a of each of the left and right rear quarter window glasses 50 can be easily positioned correctly on the corresponding left or right rear pillar 60 to be fixed to cover the same and therefore complicated work conducted for a relatively long time is not required for assembling the rear end portion of the vehicle body 10.

What is claimed is:

1. An arrangement for forming a rear partial structure of a vehicle body construction comprising,
   - a rear end portion of a vehicle body forming an opening therein,
   - a rear lamp assembly mounted on said rear end portion of the vehicle body so as to be disposed at a lower margin of said opening formed in said rear end portion of the vehicle body, and
   - a tailgate mounted on said rear end portion of the vehicle body to be operative to open and close said opening formed in said rear end portion of the vehicle body, said tailgate comprising a gate frame member which is attached through a hinge to said rear end portion of the vehicle body and a tailgate glass which is attached to said gate frame member and provided with an extended lower end portion incorporated therewith to extend outward beyond the lower edge of said gate frame member so as to cover therewith the outer surface of said rear lamp assembly when said tailgate is in a position for closing said opening formed in said rear end portion of the vehicle body.

2. An arrangement according to claim 1, wherein said gate frame member has a lower side portion provided with cutouts disposed at its left and right lower corner portions, respectively, to be covered by said extended portion provided in the tailgate glass when said tailgate is in the position for closing said opening formed in said rear portion of the vehicle body.

3. An arrangement according to claim 2, wherein said rear lamp assembly is positioned to enter in one of said cutouts provided on said lower side portion of the gate frame member when said tailgate is in the position for closing said opening formed in said rear portion of the vehicle body.

4. An arrangement according to claim 2, wherein said lower side portion of the gate frame member is provided with an additional lamp assembly disposed to face an inner surface of said extended portion provided in the tailgate glass attached to the gate frame member.

5. An arrangement according to claim 3, wherein said tailgate glass has a window portion extending to be connected at its one side with said extended portion, said window portion being provided therein with a bonding area elongating along the outer fringe thereof to be bonded to a bonding surface portion formed on said gate frame member.

6. An arrangement according to claim 5, wherein an inner surface of said bonding area provided in the window portion of the tailgate glass is covered by a ceramic coating and said extended portion provided in the tailgate glass has clear areas for covering said rear lamp assembly and said additional lamp assembly.

7. An arrangement according to claim 6, wherein said extended portion provided in the tailgate glass is formed to be a frosted area with the exception of said clear areas.

8. An arrangement according to claim 1 further comprising rear portions of left and right rear quarter window glasses each having a rear end facing one of left and right ends of said tailgate glass with a predetermined space therebetween.

9. An arrangement according to claim 8, wherein said rear end portion of the vehicle body includes left and right rear pillars facing each other with said opening therebetween, and said rear portions of the left and right rear quarter window glasses are fixed with an adhesive agent to said left and right rear pillars, respectively.

10. An arrangement according to claim 9 further comprising an air vent provided for ventilating the inside of said vehicle body on each of said left and right rear pillars, said air vent being connected to an opening formed on said rear portions of the left and right rear quarter window glasses fixed to said left and right rear pillars, respectively.

11. An arrangement according to claim 10, wherein said air vent includes an air outlet trim for engaging with said opening formed on each of said rear portions of the left and right rear quarter window glasses.

12. An arrangement according to claim 11, wherein said air outlet trim comprises a base portion fixed on one of the left and right rear pillars by a screw, a side wall portion standing up from said base portion to surround a space on said base portion and provided thereon with an opening, and a fringe portion disposed at the end of one side wall portion and engaged with the opening provided on one of said rear portions of the left and right rear quarter window glasses.

* * * * *